(12) United States Patent
Yamauchi et al.

(10) Patent No.: US 11,623,217 B2
(45) Date of Patent: Apr. 11, 2023

(54) LIQUID HANDLING DEVICE AND LIQUID HANDLING METHOD

(71) Applicant: Enplas Corporation, Saitama (JP)

(72) Inventors: Takumi Yamauchi, Saitama (JP); Nobuya Sunaga, Saitama (JP)

(73) Assignee: Enplas Corporation, Saitama (JP)

(*) Notice: Subject to any disclaimer, the term of this patent is extended or adjusted under 35 U.S.C. 154(b) by 160 days.

(21) Appl. No.: 17/198,314

(22) Filed: Mar. 11, 2021

(65) Prior Publication Data
US 2021/0283604 A1    Sep. 16, 2021

(30) Foreign Application Priority Data

Mar. 12, 2020 (JP) .............................. JP2020-043085
Apr. 10, 2020 (JP) .............................. JP2020-070852

(51) Int. Cl.
| | | |
|---|---|---|
| *C12N 15/10* | (2006.01) | |
| *B01L 3/00* | (2006.01) | |
| *B01L 7/00* | (2006.01) | |
| *F28F 3/12* | (2006.01) | |
| *G01N 35/08* | (2006.01) | |

(52) U.S. Cl.
CPC ... *B01L 3/502715* (2013.01); *B01L 3/502738* (2013.01); *B01L 3/502784* (2013.01); *G01N 35/08* (2013.01); *B01L 2300/0816* (2013.01); *B01L 2300/0867* (2013.01)

(58) Field of Classification Search
CPC ......... B01L 3/502715; B01L 3/502738; B01L 3/502784; B01L 2300/0816; B01L 2300/0867; B01L 3/527; B01L 2200/0668; B01L 2400/0487; B01L 2400/0638; B01L 3/502761; G01N 35/08; G01N 1/36; G01N 2001/362; G01N 2001/368
See application file for complete search history.

(56) References Cited

U.S. PATENT DOCUMENTS

| | | | |
|---|---|---|---|
| 2003/0138941 A1* | 7/2003 | Gong ...................... | C12Q 1/68 435/288.5 |
| 2013/0017110 A1* | 1/2013 | Villagomez ........... | F04B 43/026 417/559 |
| 2015/0260745 A1* | 9/2015 | Chan .................. | G01N 35/1011 73/864.21 |

FOREIGN PATENT DOCUMENTS

JP   2019-216708   12/2019

OTHER PUBLICATIONS

Goswami, T. K., and S. Mangaraj. "Advances in polymeric materials for modified atmosphere packaging (MAP)." Multifunctional and nanoreinforced polymers for food packaging. Woodhead Publishing, 2011. 163-242. (Year: 2011).*

* cited by examiner

*Primary Examiner* — Jennifer Wecker
*Assistant Examiner* — Oyeleye Alexander Alabi

(57) ABSTRACT

A liquid handling device includes a plurality of first wells configured for a first sample; a first channel connected to the plurality of first wells; a plurality of second wells configured for a second sample; a second channel connected to the plurality of second wells; a plurality of processing agent wells configured for a processing agent configured to process the first sample and the second sample; a processing agent channel connected to the plurality of processing agent wells; and a common channel connected to the first channel, the second channel and the processing agent channel.

5 Claims, 13 Drawing Sheets

LIQUID HANDLING DEVICE AND LIQUID HANDLING METHOD

CROSS REFERENCE TO RELATED APPLICATIONS

This application is entitled to the benefit of Japanese Patent Application No. 2020-043085, filed on Mar. 12, 2020, and Japanese Patent Application No. 2020-070852, filed on Apr. 10, 2020, the disclosure of which including the specification, drawings and abstract is incorporated herein by reference in its entirety.

TECHNICAL FIELD

The present invention relates to a liquid handling device and a liquid handling method for separately processing a first sample and a second sample.

BACKGROUND ART

In recent years, microwell plates, flow chips and the like have been used to analyze cells, proteins, and nucleic acids. Microwell plates and channel chips have the advantage of requiring only a small amount of reagents and samples for analysis, and are expected to be used in a variety of applications such as clinical tests, food tests and environment tests.

For example, PTL 1 discloses an evaluation test using cells that is conducted using a microwell plate (cell-containing container). In PTL 1, liquid such as cell suspension is dispensed to each well of the microwell plate using a dispenser, an ink-jet head and the like.

CITATION LIST

Patent Literature

PTL 1
Japanese Patent Application Laid-Open No. 2019-216708

SUMMARY OF INVENTION

Technical Problem

As disclosed in PTL 1, with a microwell plate and a dispenser or an ink-jet head, various types of analysis can be performed while preventing contamination between different samples. When a microwell plate and a dispenser or an ink-jet head are used in the above-mentioned manner, however, the dispenser or the ink-jet head has to be moved when common reagent or the like is provided to each well, and as such the size of the apparatus is disadvantageously increased.

An object of the present invention is to provide a liquid handling device and a liquid handling method that can process a first sample and a second sample while preventing contamination without the need for large apparatuses.

Solution to Problem

A liquid handling device of an embodiment of the present invention is configured to process a first sample and a second sample, the liquid handling device including: a plurality of first wells configured for the first sample; a first channel connected to the plurality of first wells; a plurality of second wells configured for the second sample; a second channel connected to the plurality of second wells; a plurality of processing agent wells configured for a processing agent configured to process the first sample and the second sample; a processing agent channel connected to the plurality of processing agent wells; and a common channel connected to the first channel, the second channel and the processing agent channel.

A liquid handling method of an embodiment of the present invention is a method of processing the first sample and the second sample using the liquid handling device, the method including: providing the first sample to one of the plurality of first wells; providing the second sample to one of the plurality of second wells; moving, from one of the plurality of processing agent wells, the processing agent to the first well to which the first sample has been provided through the processing agent channel, the common channel and the first channel; moving liquid containing the first sample to the first channel from the first well provided with the first sample and then moving the liquid containing the first sample in the first channel to one of the plurality of first wells; moving, from one of the plurality of processing agent wells, the processing agent to the second well to which the second sample has been provided through the processing agent channel, the common channel and the second channel; and moving liquid containing the second sample to the second channel from the second well provided with the second sample and then moving the liquid containing the second sample in the second channel to one of the plurality of second wells.

Advantageous Effects of Invention

According to the present invention, it is possible to provide a liquid handling device and a liquid handling method that can process a first sample and a second sample while preventing contamination without the need for large apparatuses.

DESCRIPTION OF EMBODIMENTS

An embodiment of the present invention is elaborated below with reference to the accompanying drawings.
Configurations of Liquid Handling System and Liquid Handling Device In the present embodiment, a liquid handling system and a liquid handling device that can process a first sample, a second sample, a third sample and a fourth sample with processing agent of several types are described.

Figure 1A:
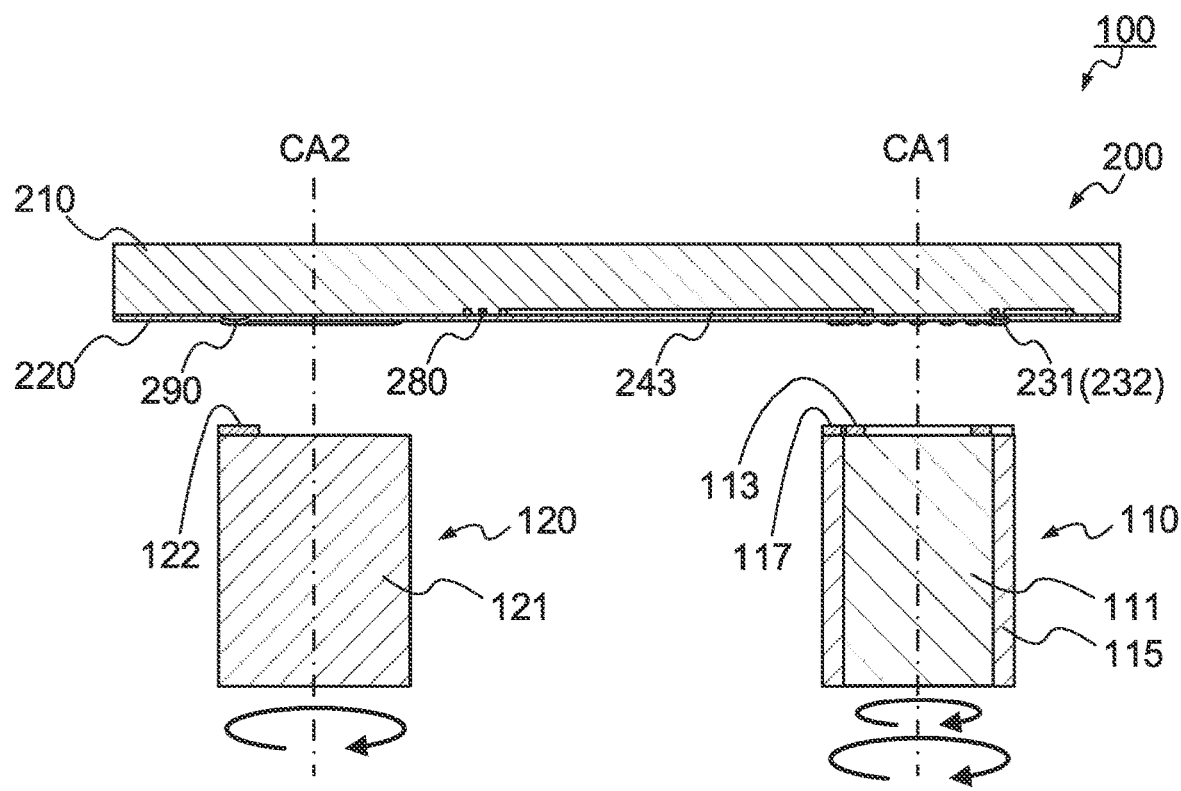
FIG. 1A is a sectional view illustrating a configuration of a liquid handling system according to an embodiment.
Figure 1B:
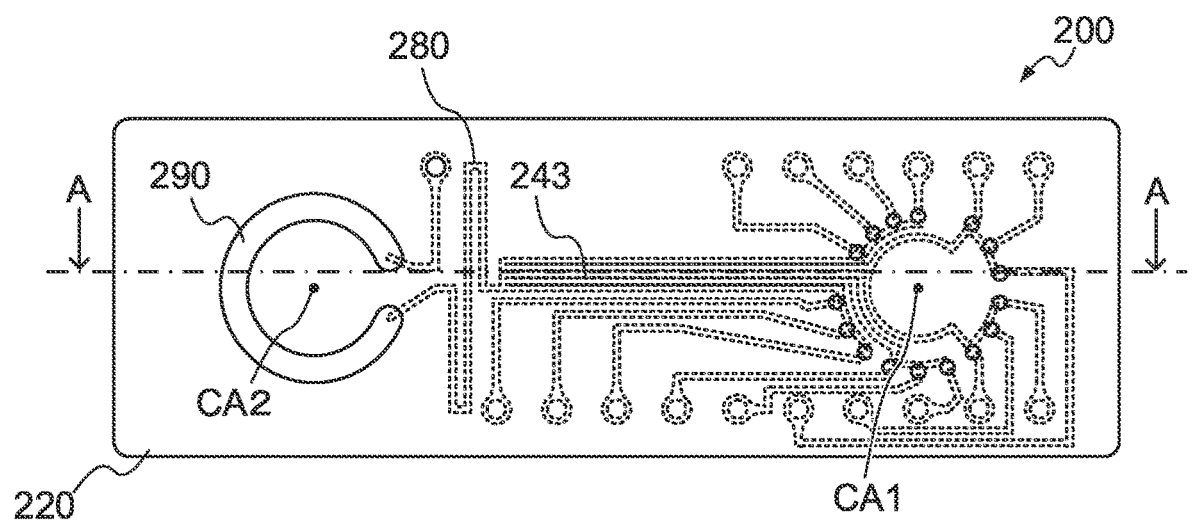
FIG. 1B is a bottom view of a liquid handling device according to the embodiment.

FIG. 1A is a sectional view illustrating a configuration of liquid handling system 100 according to the present embodiment. FIG. 1B is a bottom view of liquid handling device (channel chip) 200 according to the present embodiment. In FIG. 1B, inner channels and the like are illustrated with broken lines. The cross-section of liquid handling device 200 in FIG. 1A is a sectional view taken along line A-A of FIG. 1B.

As illustrated in FIG. 1A, liquid handling system 100 includes first rotary member 110, second rotary member 120 and liquid handling device (channel chip) 200. First rotary member 110 includes first inner rotary member 111 and first outer rotary member 115. First inner rotary member 111 and first outer rotary member 115 are rotated independently of each other about first central axis CA1 by an external driving mechanism not illustrated in the drawing. Second rotary member 120 is rotated around second central axis CA2 by an external driving mechanism not illustrated in the drawing. Liquid handling device 200 includes substrate 210 and film 220, and film 220 is installed such that film 220 makes contact with first rotary member 110 and second rotary member 120. Note that in FIG. 1A, for the purpose of clearly illustrating the configuration of liquid handling system 100, the components are separated from each other.

Figure 2A:
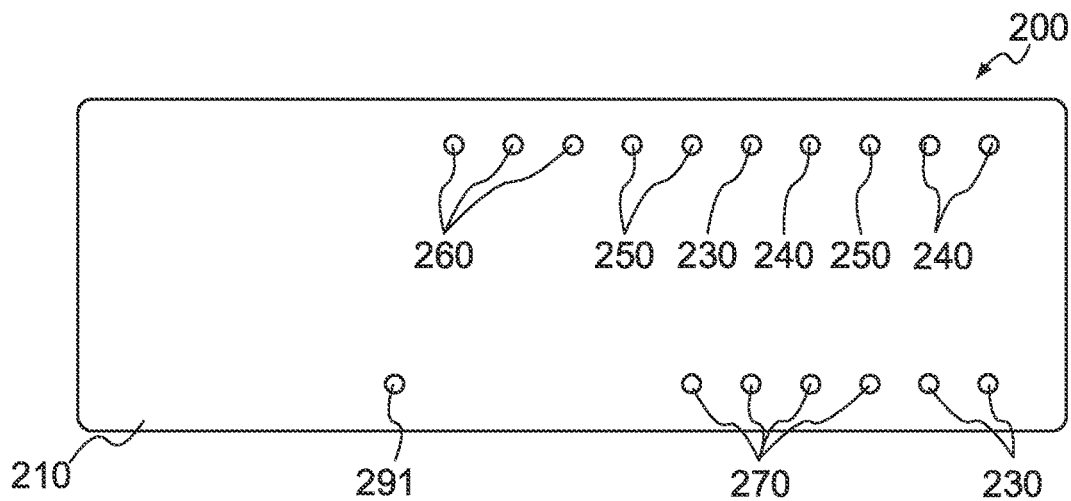
FIG. 2A is a plan view of the liquid handling device according to the embodiment.
Figure 2B:
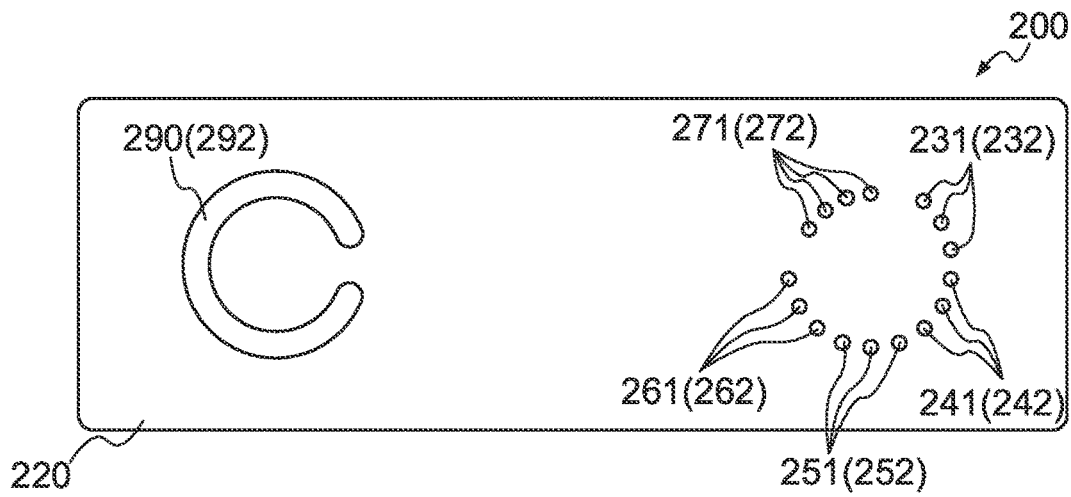
FIG. 2B is a bottom view of the liquid handling device.
Figure 2C:
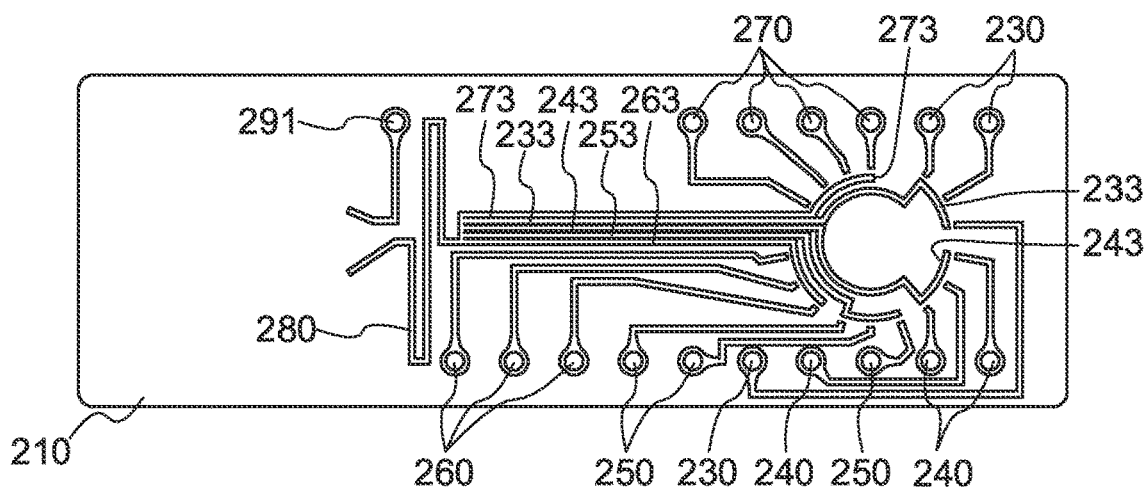
FIG. 2C is a bottom view of a substrate.
Figure 3:
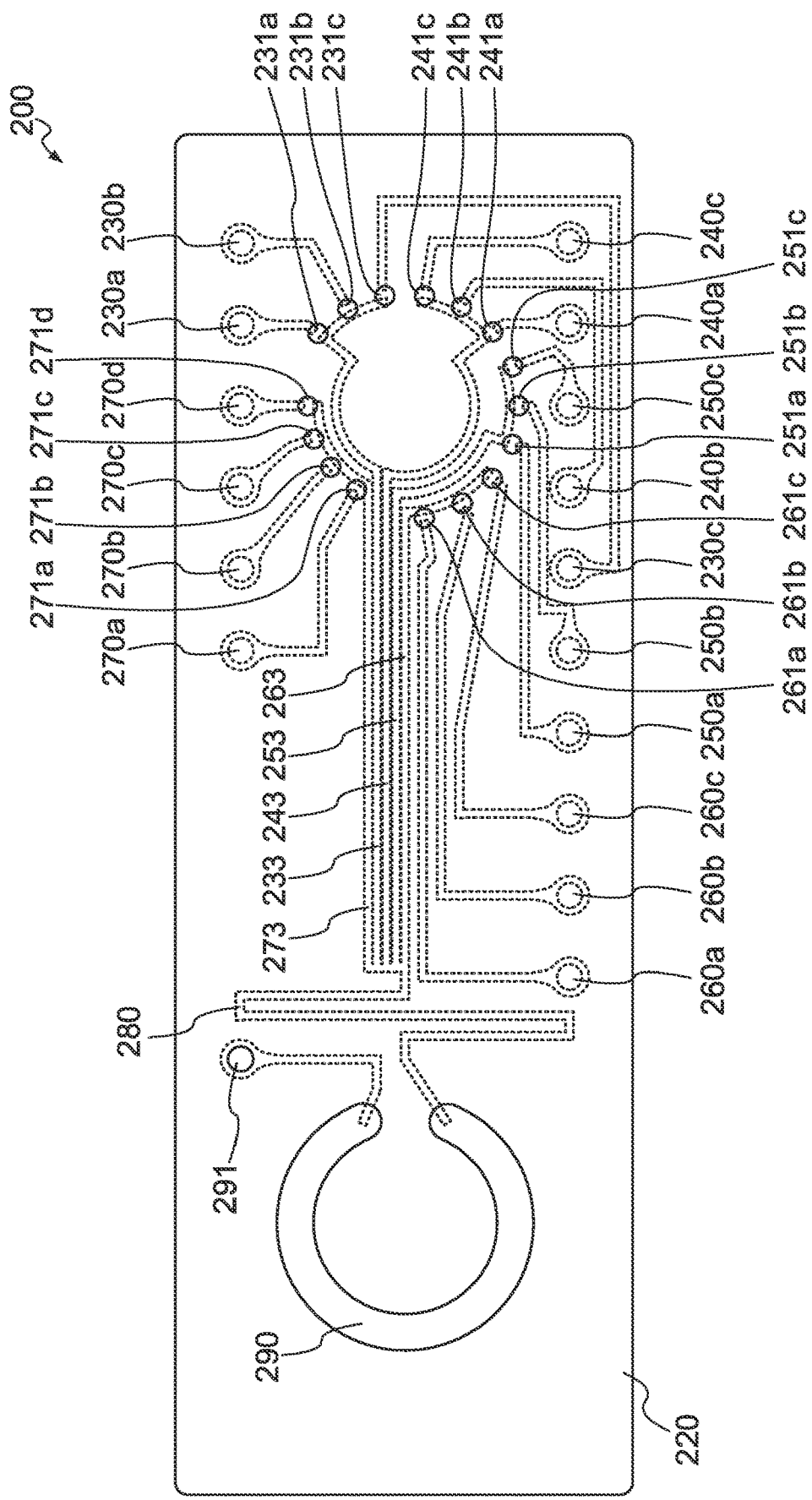
FIG. 3 is a bottom view for describing a configuration of the liquid handling device according to the embodiment.
Figure 4:
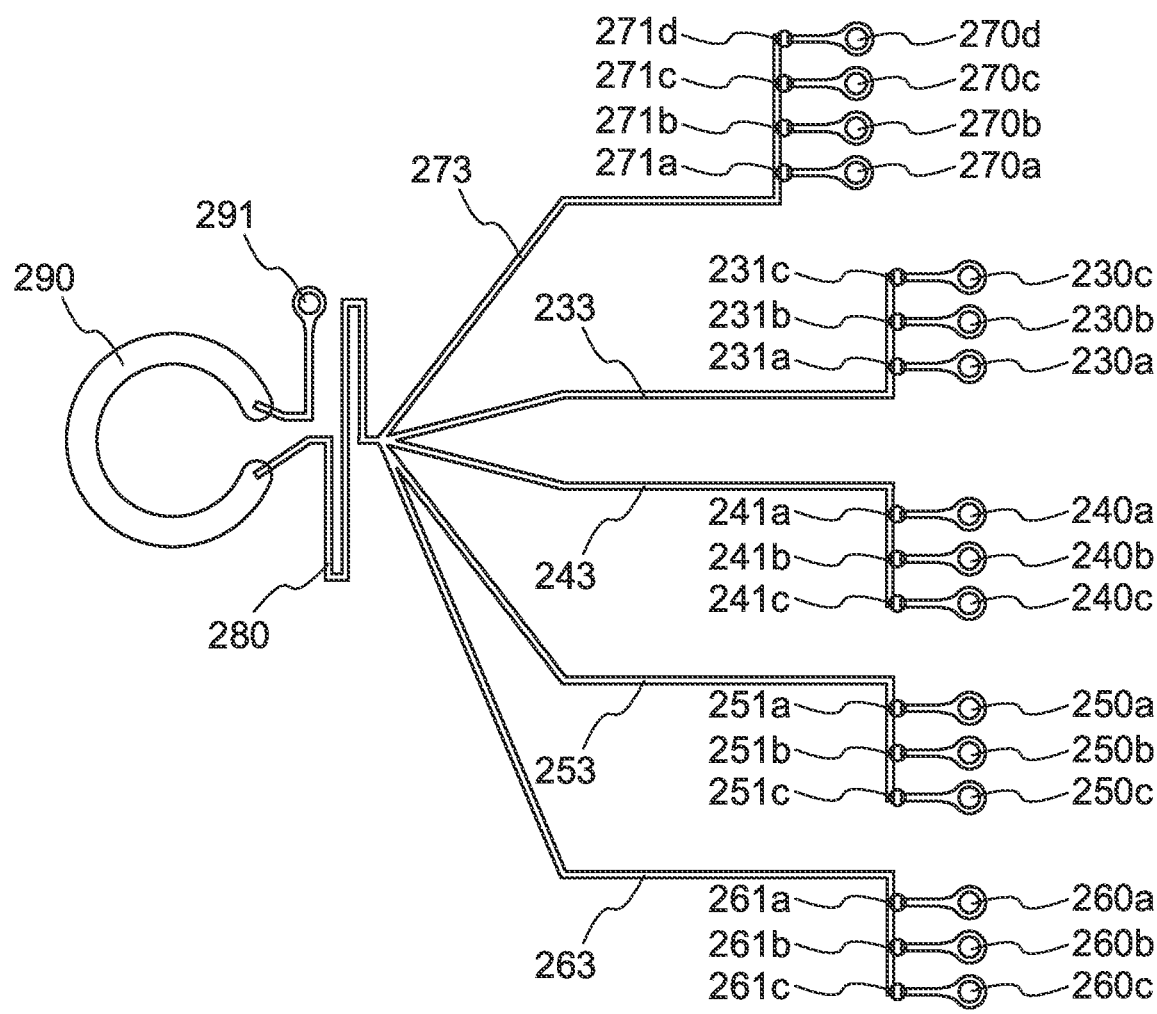
FIG. 4 is a schematic view for describing a configuration of the liquid handling device according to the embodiment.

FIGS. 2A to 4 illustrate a configuration of liquid handling device 200. FIG. 2A is a plan view of liquid handling device 200 (a plan view of substrate 210). FIG. 2B is a bottom view of liquid handling device 200 (a bottom view of film 220). FIG. 2C is a bottom view of substrate 210 (a bottom view of liquid handling device 200 with film 220 removed). FIG. 3 is a bottom view for describing a configuration of liquid handling device 200 (the same drawing as FIG. 1B). In FIG. 3, grooves (channels) and the like formed in the surface substrate 210 on film 220 side are illustrated with broken lines. FIG. 4 is a schematic view for describing a configuration of a channel of liquid handling device 200.

As described above, liquid handling device 200 includes substrate 210 and film 220 (see FIG. 1A). In substrate 210, grooves configured to be channels and through holes configured to be inlet ports or ejection ports are formed. Film 220 is joined to one surface of substrate 210 to close the openings of the recess and the through hole formed in substrate 210. A part of the region of film 220 functions as a diaphragm. The groove of substrate 210 closed with film 220 serves as a channel for carrying fluid such as reagent, liquid sample, washing solution, gas, and powder.

The thickness of substrate 210 is not limited. For example, substrate 210 has a thickness of 1 mm to 10 mm. Substrate 210 may have a film shape with a thickness of less than 1 mm. In addition, the material of substrate 210 is not limited. For example, the material of substrate 210 may be appropriately selected from publicly known resins and glass. The material of substrate 210 may be an elastic body. Examples of the material of substrate 210 include polyethylene terephthalate, polycarbonate, polymethylmethacrylate, polyvinyl chloride, polypropylene, polyether, polyethylene, polystyrene, cyclo-olefin resin, silicone resin and elastomer.

The thickness of film 220 is not limited as long as it can function as a diaphragm. For example, the thickness of film 220 is 30 µm to 300 µm. In addition, the material of film 220 is not limited as long as it can function as a diaphragm. For example, the material of film 220 may be appropriately selected from publicly known resins. Examples of the material of film 220 include polyethylene terephthalate, polycarbonate, polymethylmethacrylate, polyvinyl chloride, polypropylene, polyether, polyethylene, polystyrene, cyclo-olefin resin, silicone resin and elastomer. For example, film 220 is joined to substrate 210 by thermal welding, laser welding, an adhesive agent and the like.

As illustrated in FIGS. 3 and 4, liquid handling device 200 according to the present embodiment includes a plurality of first wells 230, a plurality of first valves 231, first channel 233, a plurality of second wells 240, a plurality of second valves 241, second channel 243, a plurality of third wells 250, a plurality of third valves 251, third channel 253, a plurality of fourth wells 260, a plurality of fourth valves 261, fourth channel 263, a plurality of processing agent wells 270, a plurality of processing agent valves 271, processing agent channel 273, common channel 280, rotary membrane pump 290, and ventilation hole 291.

The plurality of first wells 230 is bottomed recesses used for the first sample. The number of first wells 230 is not limited and may be appropriately set in accordance with the use. In the present embodiment, liquid handling device 200 includes three first wells, 230a to 230c. For example, first well 230a is a well to which the first sample is introduced. First well 230b is a well configured to house an effluent generated in a process of the first sample. First well 230c is a well configured to house washing solution for washing first channel 233.

The plurality of second wells 240 is bottomed recesses used for the second sample. The number of second wells 240 is not limited and may be appropriately set in accordance with the use. In the present embodiment, liquid handling device 200 includes three second wells, 240a to 240c. For example, second well 240a is a well to which the second sample is introduced. Second well 240b is a well configured to house an effluent generated in a process of the second sample. Second well 240c is a well configured to house washing solution for washing second channel 243.

The plurality of third wells 250 is bottomed recesses used for the third sample. The number of third wells 250 is not limited and may be appropriately set in accordance with the use. In the present embodiment, liquid handling device 200 includes three third wells, 250a to 250c. For example, third well 250a is a well to which the third sample is introduced. Third well 250b is a well configured to house an effluent generated in a process of the third sample. Third well 250c is a well configured to house washing solution for washing third channel 253.

The plurality of fourth wells 260 is bottomed recesses used for the fourth sample. The number of fourth wells 260 is not limited and may be appropriately set in accordance with the use. In the present embodiment, liquid handling device 200 includes three fourth wells, 260a to 260c. For example, fourth well 260a is a well to which the fourth sample is introduced. Fourth well 260b is a well configured to house an effluent generated in a process of the fourth sample. Fourth well 260c is a well configured to house washing solution for washing fourth channel 263.

The plurality of processing agent wells 270 is bottomed recesses used for housing a processing agent configured to process samples. The number of processing agent wells 270 is not limited, and may be appropriately set in accordance with the type of the required processing agent. In the present embodiment, liquid handling device 200 includes four processing agent wells, 270a to 270d. For example, processing agent well 270a is a well configured to house a solution for lysing cells. Processing agent well 270b is a well configured to house dispersion liquid of magnetic beads that nonspecifically adsorb DNAs. Processing agent well 270c is a well configured to house washing solution for washing processing agent channel 273. Processing agent well 270d is a well to which an eluate for eluting DNA bound to magnetic beads is housed. The type of the processing agent to be housed in the plurality of processing agent wells 270 is not limited, and may be appropriately selected in accordance with the use of liquid handling device 200.

In the present embodiment, each of the wells (recesses) is composed of a through hole formed in substrate 210 and film 220 that closes one opening of the through hole. The shape and the size of each recess are not limited and may be appropriately set in accordance with the use. The shape of each recess is, for example, a substantially columnar shape. The width of each recess is, for example, approximately 2 mm.

First channel 233, second channel 243, third channel 253, fourth channel 263 and processing agent channel 273 are channels in which fluid can move. One end portion of first channel 233 is connected to the plurality of first wells 230a to 230c, and the other end portion of first channel 233 is connected to common channel 280. Likewise, one end portion of second channel 243 is connected to the plurality of second wells 240a to 240c, and the other end portion of second channel 243 is connected to common channel 280. One end portion of third channel 253 is connected to the plurality of third wells 250a to 250c, and the other end portion of third channel 253 is connected to common channel 280. One end portion of fourth channel 263 is connected to the plurality of fourth wells 260a to 260c, and the other end portion of fourth channel 263 is connected to common channel 280. One end portion of processing agent channel 273 is connected to the plurality of processing agent wells 270a to 270d, and the other end portion of processing agent channel 273 is connected to common channel 280.

In the present embodiment, each of the channels is composed of a groove formed in substrate 210 and film 220 that closes the opening of the groove. The cross-sectional area and the cross-sectional shape of each channel are not limited. The "cross-section of channel" as used herein means the cross-section of a channel orthogonal to the flow direction of the liquid. The cross-sectional shape of each channel is, for example, a substantially rectangular shape with each side (width and depth) having a length of approximately several tens of micrometers. The cross-sectional area of each channel may be or may not be constant in the flow direction of the fluid. In the present embodiment, the cross-sectional area of each channel is constant.

The plurality of first valves 231, the plurality of second valves 241, the plurality of third valves 251, the plurality of fourth valves 261 and the plurality of processing agent valves 271 are membrane valves (diaphragm valves) that control the flow of the liquid in first channel 233, second channel 243, third channel 253, fourth channel 263 and processing agent channel 273, respectively. In the present embodiment, these valves are rotary membrane valves whose opening and closing are controlled by rotation of first rotary member 110. To be more specific, the opening and closing of the plurality of first valves 231, the plurality of second valves 241, the plurality of third valves 251 and the plurality of fourth valves 261 are controlled by rotation of first outer rotary member 115. On the other hand, the opening and closing of the plurality of processing agent valves 271 are controlled by the rotation of first inner rotary member 111. In the present embodiment, the plurality of first valves 231, the plurality of second valves 241, the plurality of third valves 251 and the plurality of fourth valves 261 are disposed on the circumference of a first circle centered on central axis CA1, and the plurality of processing agent valves 271 is disposed on the circumference of a second circle concentric with the first circle.

Figure 13A:
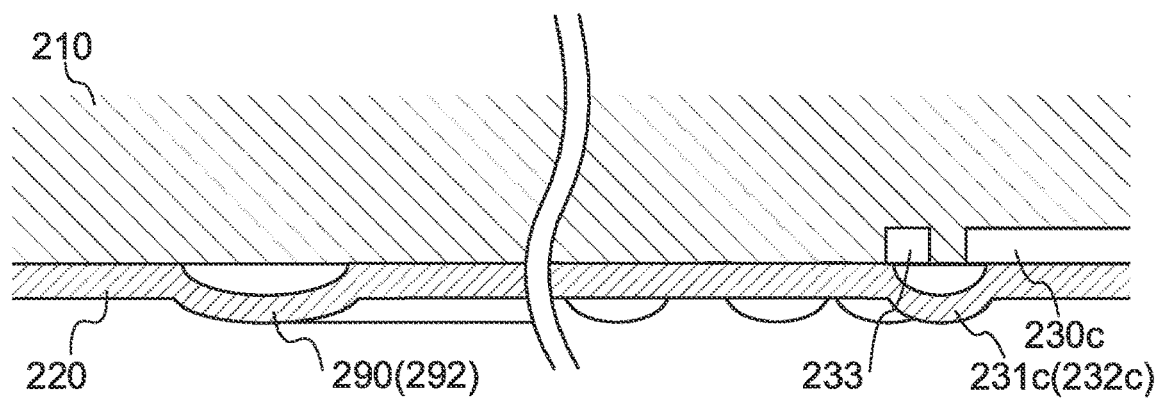
FIG. 13A is a partially enlarged view of the liquid handling device according to the embodiment.

The plurality of first valves 231 is disposed between the plurality of first wells 230 and first channel 233 (see FIG. 13A). In the present embodiment, liquid handling device 200 includes three first valves, 231a to 231c. First valve 231a is disposed between first well 230a and first channel 233. Likewise, first valve 231b is disposed between first well 230b and first channel 233. First valve 231c is disposed between first well 230c and first channel 233 (see FIG. 13A).

The plurality of second valves 241 is disposed between the plurality of second wells 240 and second channel 243. In the present embodiment, liquid handling device 200 includes three second valves, 241a to 241c. Second valve 241a is disposed between second well 240a and second channel 243. Likewise, second valve 241b is disposed between second well 240b and second channel 243. Second valve 241c is disposed between second well 240c and second channel 243.

The plurality of third valves 251 is disposed between the plurality of third wells 250 and third channel 253. In the present embodiment, liquid handling device 200 includes three third valves, 251a to 251c. Third valve 251a is disposed between third well 250a and third channel 253. Likewise, third valve 251b is disposed between third well 250b and third channel 253. Third valve 251c is disposed between third well 250c and third channel 253.

The plurality of fourth valves 261 is disposed between the plurality of fourth wells 260 and fourth channel 263. In the present embodiment, liquid handling device 200 includes three fourth valves, 261a to 261c. Fourth valve 261a is disposed between fourth well 260a and fourth channel 263. Likewise, fourth valve 261b is disposed between fourth well 260b and fourth channel 263. Fourth valve 261c is disposed between fourth well 260c and fourth channel 263.

The plurality of processing agent valves 271 is disposed between the plurality of processing agent wells 270 and processing agent channel 273. In the present embodiment, liquid handling device 200 includes four processing agent valves, 271a to 271d. Processing agent valve 271a is disposed between processing agent well 270a and processing agent channel 273. Likewise, processing agent valve 271b is disposed between processing agent well 270b and processing agent channel 273. Processing agent valve 271c is disposed between processing agent well 270c and processing agent channel 273. Processing agent valve 271d is disposed between processing agent well 270d and processing agent channel 273.

The plurality of first valves 231a to 231c include partition walls and diaphragms 232a to 232c, respectively. Likewise, the plurality of second valves 241a to 241c include partition walls and diaphragms 242a to 242c, respectively. The plurality of third valves 251a to 251c include partition walls and diaphragms 252a to 252c, respectively. The plurality of fourth valves 261a to 261c include partition walls and diaphragms 262a to 262c, respectively. The plurality of processing agent valves 271a to 271d include partition walls and diaphragms 272a to 272d, respectively.

In the present embodiment, the partition walls of first valves 231a to 231c are disposed between first wells 230a to 230c and first channel 233, respectively (see FIG. 13A). Diaphragms 232a to 232c of first valves 231a to 231c are disposed opposite to the corresponding partition walls (see FIG. 13A). Likewise, the partition walls of second valves 241a to 241c are disposed between second wells 240a to 240c and second channel 243. Diaphragms 242a to 242c of second valves 241a to 241c are disposed opposite to the corresponding partition walls. The partition walls of third valves 251a to 251c are disposed between third wells 250a to 250c and third channel 253. Diaphragms 252a to 252c of third valves 251a to 251c are disposed opposite to the corresponding partition walls. The partition walls of fourth valves 261a to 261c are disposed between fourth well 260a to 260c and fourth channel 263. Diaphragms 262a to 262c of fourth valves 261a to 261c are disposed opposite to the corresponding partition walls. The partition walls of processing agent valves 271a to 271d are disposed between processing agent well 270a to 270d and processing agent channel 273. Diaphragms 272a to 272d of processing agent valves 271a to 271d are disposed opposite to the corresponding partition walls.

The partition walls of first valves 231a to 231c function as valve seats of membrane valves (diaphragm valves) for opening and closing between first wells 230a to 230c and first channel 233, respectively. Likewise, the partition walls of second valves 241a to 241c function as valve seats of membrane valves for opening and closing between second wells 240a to 240c and second channel 243, respectively. The partition walls of third valves 251a to 251c function as valve seats of membrane valves for opening and closing between third wells 250a to 250c and third channel 253. The partition walls of fourth valves 261a to 261c function as valve seats of membrane valves for opening and closing between fourth well 260a to 260c and fourth channel 263. The partition walls of processing agent valves 271a to 271d function as valve seats of membrane valves for opening and closing between processing agent well 270a to 270d and processing agent channel 273. The shape and the height of each partition wall are not limited as long as the above-mentioned functions can be ensured. The shape of each partition wall is, for example, a quadrangular prism shape. The height of each partition wall is, for example, the same as the depth of each channel.

Each of diaphragms 232a to 232c of first valves 231a to 231c, diaphragms 242a to 242c of second valves 241a to 241c, diaphragms 252a to 252c of third valves 251a to 251c, diaphragms 262a to 262c of fourth valves 261a to 261c, and diaphragms 272a to 272d of processing agent valves 271a to 271d is a part of flexible film 220, and has a substantially spherical cap shape (dome shape) (see FIG. 1A). Film 220 is disposed on substrate 210 such that each diaphragm faces the corresponding partition wall in a noncontact manner.

Diaphragms 232a to 232c of first valves 231a to 231c, diaphragms 242a to 242c of second valves 241a to 241c, diaphragms 252a to 252c of third valves 251a to 251c, and diaphragms 262a to 262c of fourth valves 261a to 261c deflect toward the corresponding partition walls when pressed by first outer protrusion 117 (described later) of first outer rotary member 115. In this manner, the diaphragms function as valve elements of diaphragm valves. For example, when first outer protrusion 117 is not pressing diaphragm 232a of first valve 231a, first well 230a and first channel 233 are communicated with each other through the gap between diaphragm 232a and the partition wall. On the other hand, when first outer protrusion 117 is pressing diaphragm 232a such that diaphragm 232a makes contact with the partition wall, first well 230a and first channel 233 are not communicated with each other.

Diaphragms 272a to 272d of processing agent valves 271a to 271d deflect toward the corresponding partition wall when pressed by first inner protrusion 113 of first inner rotary member 111 (described later). In this manner, the diaphragms function as valve elements of diaphragm valves. For example, when first inner protrusion 113 is not pressing diaphragm 272a of processing agent valve 271a, processing agent well 270a and processing agent channel 273 are communicated with each other through the gap between diaphragm 272a and the partition wall. On the other hand, when first inner protrusion 113 is pressing diaphragm 272a such that diaphragm 272a makes contact with the partition wall, processing agent well 270a and processing agent channel 273 are not communicated with each other.

Common channel 280 is a channel in which fluid can move. One end portion of common channel 280 is connected to first channel 233, second channel 243, third channel 253, fourth channel 263 and processing agent channel 273. In common channel 280, liquid having flowed through processing agent channel 273 flows. The other end portion of common channel 280 is connected to rotary membrane pump 290. In the present embodiment, common channel 280 is composed of a groove formed in substrate 210 and film 220 that closes the opening of the groove. The cross-sectional area and the cross-sectional shape of common channel 280 are not limited. The cross-sectional shape of common channel 280 is, for example, a substantially rectangular shape with each side (width and depth) having a length of approximately several tens of micrometers. The cross-sectional area of common channel 280 may be or may not be constant in the flow direction of the fluid. In the present embodiment, the cross-sectional area of common channel 280 is constant.

Rotary membrane pump 290 is a space having a substantially arc-shape (C-shape) in plan view and is formed between substrate 210 and film 220. One end portion of rotary membrane pump 290 is connected to common channel 280, and the other end portion of rotary membrane pump 290 is connected to ventilation hole 291. In the present embodiment, rotary membrane pump 290 is composed of the bottom surface of substrate 210 and diaphragm 292 facing the bottom surface with a space therebetween. Diaphragm 292 is a part of flexible film 220 (see FIG. 1A). Diaphragm 292 is disposed on the circumference of one circle centered on central axis CA2. The cross-sectional shape of diaphragm 292 in the direction orthogonal to the circumference is not limited, and is an arc-shape in the present embodiment.

Diaphragm 292 of rotary membrane pump 290 is deflected to make contact with substrate 210 when pressed by second protrusion 122 (described later) of second rotary member 120. For example, when second protrusion 122 presses diaphragm 292 while making sliding contact with it from the connecting part with common channel 280 toward the connecting part with ventilation hole 291 (clockwise in FIG. 3), the inside of common channel 280 is set to a negative pressure such that the fluid in common channel 280 moves toward rotary membrane pump 290 and that the liquid in processing agent channel 273 moves into common channel 280. On the other hand, when second protrusion 122 presses diaphragm 292 while making sliding contact with it from the connecting part with ventilation hole 291 toward the connecting part with common channel 280 (counterclockwise in FIG. 3), the inside of common channel 280 is set to a positive pressure such that the fluid inside rotary membrane pump 290 moves toward common channel 280 and that the liquid in common channel 280 moves into first channel 233, second channel 243, third channel 253 or fourth channel 263.

Ventilation hole 291 is a bottomed recess configured to introduce fluid (e.g., air) into rotary membrane pump 290 and discharge the fluid (e.g., air) inside rotary membrane pump 290 when second protrusion 122 of second rotary member 120 presses diaphragm 292 of rotary membrane pump 290 while making sliding contact with it. In the present embodiment, ventilation hole 291 is composed of a through hole formed in substrate 210 and film 220 that closes one opening of the through hole. The shape and the size of ventilation hole 291 are not limited, and may be appropriately set as necessary. The shape of ventilation hole 291 is, for example, a substantially columnar shape. The width of ventilation hole 291 is, for example, approximately 2 mm.

Figure 5A:
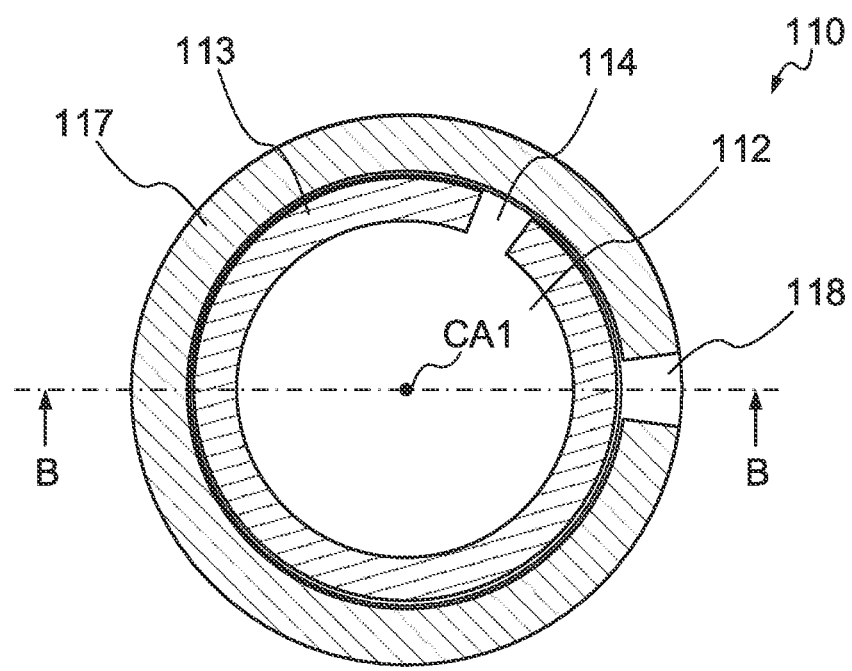
FIG. 5A is a plan view of a first rotary member.
Figure 5B:
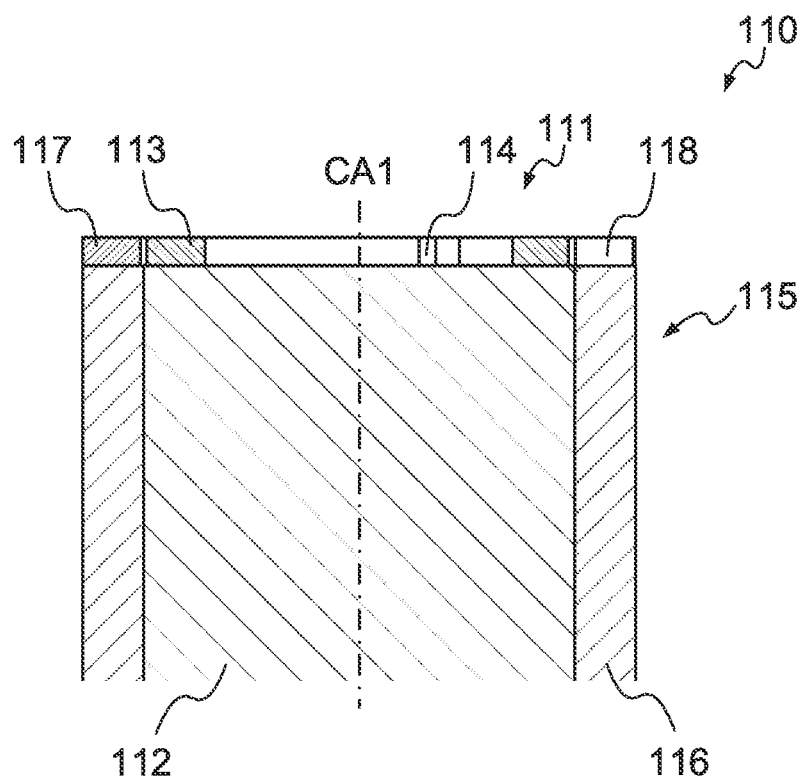
FIG. 5B is a sectional view taken along line B-B of FIG. 5A.

FIG. 5A is a plan view of first rotary member 110, and FIG. 5B is a sectional view taken along line B-B of FIG. 5A. In FIG. 5A, for the sake of clarity, the top surfaces of first inner protrusion 113 and first outer protrusion 117 are hatched.

First rotary member 110 includes first inner rotary member 111 disposed inside and first outer rotary member 115 disposed outside.

First inner rotary member 111 includes columnar first inner body 112, first inner protrusion 113 disposed in the top surface of first inner body 112, and first inner recess 114 disposed in the top surface of first inner body 112. First inner body 112 is rotatable about first central axis CAL First inner body 112 is rotated by the external driving mechanism not illustrated in the drawing.

In the upper part of first inner body 112, first inner protrusion 113 configured to close processing agent valves 271a to 271d by pressing diaphragms 272a to 272d, and first inner recess 114 configured to open the valves without pressing the diaphragms are provided. First inner protrusion 113 and first inner recess 114 are disposed on the circumference of a circle centered on central axis CAL In the present embodiment, the shape of first inner protrusion 113 in plan view is an arc-shape (C-shape) corresponding to a part of a circle centered on central axis CAL The region where first inner protrusion 113 is not provided on the circumference is first inner recess 114.

Note that it suffices that first inner protrusion 113 is relatively protruded than first inner recess 114, and that first inner recess 114 is relatively recessed than first inner protrusion 113. That is, it suffices that first inner protrusion 113 can function as a pressure part and that first inner recess 114 can function as a non-pressure part. For example, in the example illustrated in FIG. 5B, first inner protrusion 113 is protruded from the top surface (reference surface) of first inner body 112, and the bottom surface of first inner recess 114 is a surface at the same height as the top surface (reference surface) of first inner body 112. Conversely, the top surface of first inner protrusion 113 may be a surface at the same height as the top surface (reference surface) of first inner body 112, and in that case, first inner recess 114 is recessed from the top surface (reference surface) of first inner body 112.

First outer rotary member 115 includes cylindrical first outer body 116, first outer protrusion 117 disposed in the top surface of first outer body 116, and first outer recess 118 disposed in the top surface of first outer body 116. First outer body 116 is rotatable about first central axis CA1 independently of first inner body 112. First outer body 116 is rotated by the external driving mechanism not illustrated in the drawing.

In the upper part of first outer body 116, first outer protrusion 117 configured to close first valves 231a to 231c, second valves 241a to 241c, third valves 251a to 251c, and fourth valves 261a to 261c by pressing diaphragms 232a to 232c, diaphragms 242a to 242c, diaphragms 252a to 252c, and diaphragms 262a to 262c, and first outer recess 118 configured to open the valves without pressing the diaphragms are provided. First outer protrusion 117 and first outer recess 118 are disposed on the circumference of a circle centered on central axis CAL In the present embodiment, the shape of first outer protrusion 117 in plan view is an arc-shape (C-shape) corresponding to a part of a circle centered on central axis CAL The region where first outer protrusion 117 is not provided on the circumference is first outer recess 118.

Note that it suffices that first outer protrusion 117 is relatively protruded than first outer recess 118, and that first outer recess 118 is relatively recessed than first outer protrusion 117. That is, it suffices that first outer protrusion 117 can function as a pressure part, and that first outer recess 118 can function as a non-pressure part. For example, in the example illustrated in FIG. 5B, first outer protrusion 117 is protruded from the top surface (reference surface) of first outer body 116, and the bottom surface of first outer recess 118 is a surface at the same height as the top surface (reference surface) of first outer body 116. Conversely, the top surface of first outer protrusion 117 may be a surface at the same height as the top surface (reference surface) of first outer body 116, and in that case, first outer recess 118 is recessed from the top surface (reference surface) of first outer body 116.

Figure 6A:
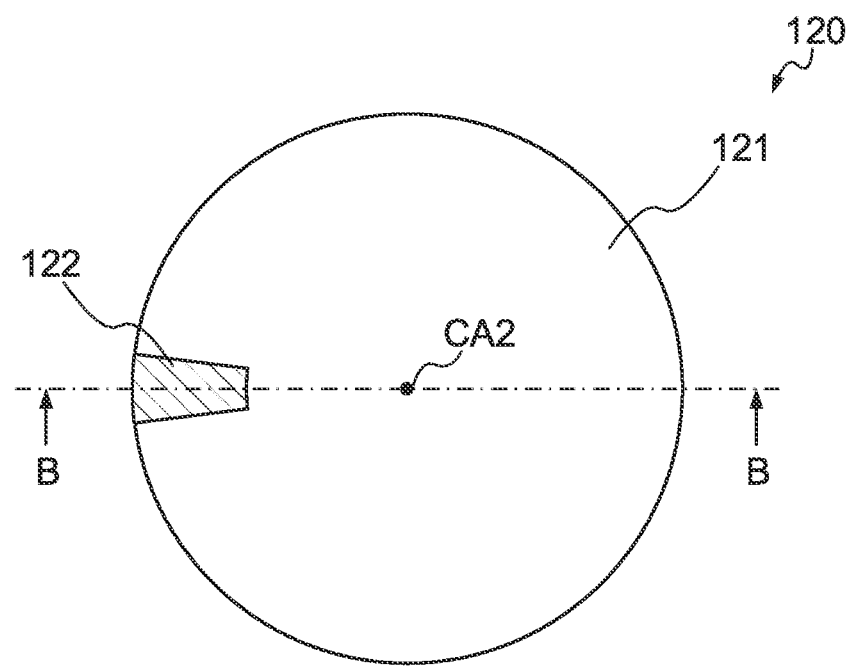
FIG. 6A is a plan view of a second rotary member.
Figure 6B:
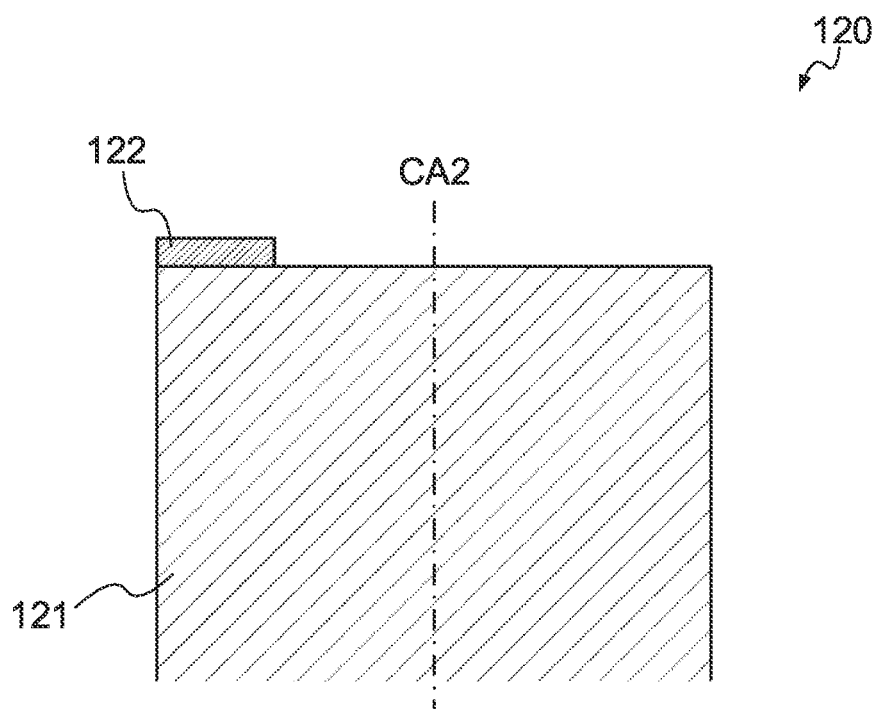
FIG. 6B is a sectional view taken along line B-B of FIG. 6A.

FIG. 6A is a plan view of second rotary member 120, and FIG. 6B is a sectional view taken along line B-B of FIG. 6A. In FIG. 6A, for the sake of clarity, the top surface of second protrusion 122 is hatched.

Second rotary member 120 includes columnar second body 121 and second protrusion 122 disposed on the top surface of second body 121. Second body 121 is rotatable about second central axis CA2. Second body 121 is rotated by the external driving mechanism not illustrated in the drawing.

In the upper part of second body 121, second protrusion 122 configured to operate rotary membrane pump 290 by pressing diaphragm 292 while making sliding contact with it is provided. Second protrusion 122 is disposed on the circumference of a circle centered on central axis CA2. The shape of second protrusion 122 is not limited as long as rotary membrane pump 290 can be appropriately operated.

In the present embodiment, the shape of second protrusion 122 in plan view is an arc-shape corresponding to a part of a circle centered on central axis CA2.

Operations of Liquid Handling System and Liquid Handling Device

Next, with reference to FIGS. 7A to 12, operations of liquid handling system 100 and liquid handling device 200 are described. For convenience of description, in FIGS. 7A to 12, first valves 231a to 231c, second valves 241a to 241c, third valves 251a to 251c, fourth valves 261a to 261c and processing agent valves 271a to 271d are illustrated with black circles when they are pressed and closed by first inner protrusion 113 or first outer protrusion 117 of first rotary member 110, and are illustrated with blank circles when they face first inner recess 114 or first outer recess 118 without being closed.

Figure 7A:
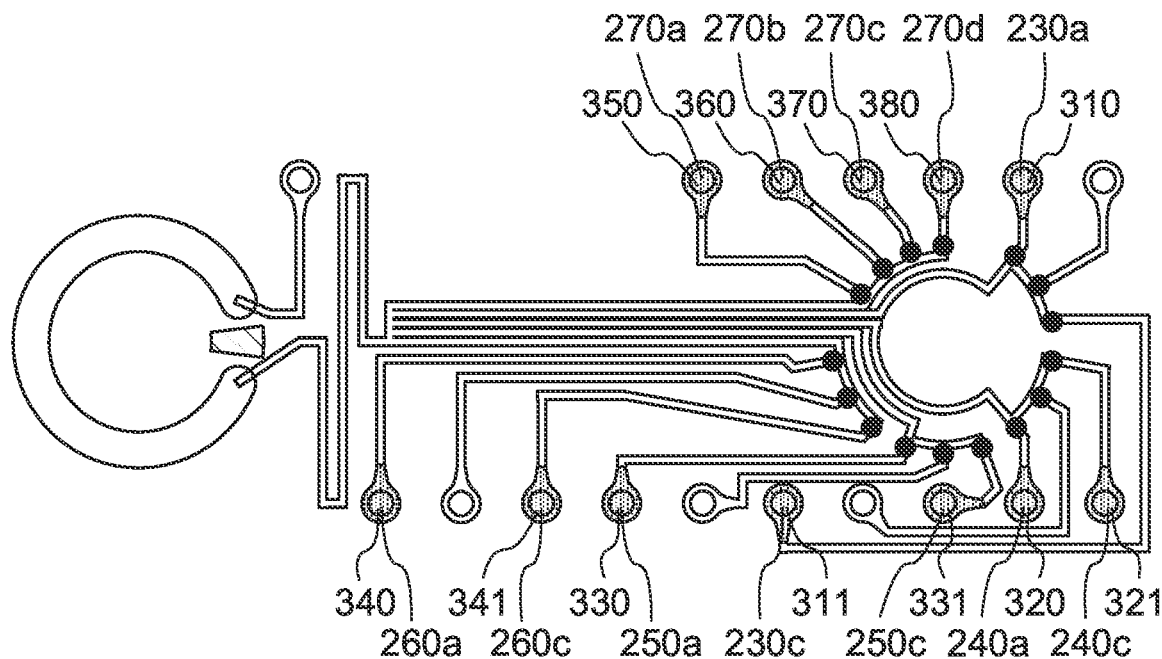
FIGS. 7A and 7B are schematic views for describing operations of the liquid handling system and the liquid handling device according to the embodiment.

First, as illustrated in FIG. 7A, first sample 310 is introduced to first well 230a, second sample 320 is introduced to second well 240a, third sample 330 is introduced to third well 250a, and fourth sample 340 is provided to fourth well 260a. At this time, all valves are closed. The following description assumes that first sample 310, second sample 320, third sample 330 and fourth sample 340 are cell suspensions different from each other.

In addition, washing solution 311 for washing first channel 233 is introduced to first well 230c, washing solution 321 for washing second channel 243 is introduced to second well 240c, washing solution 331 for washing third channel 253 is introduced to third well 250c, and washing solution 341 for washing fourth channel 263 is introduced to fourth well 260c.

Further, first processing agent 350 is introduced to processing agent well 270a, second processing agent 360 is introduced to processing agent well 270b, third processing agent 370 is introduced to processing agent well 270c, and fourth processing agent 380 is introduced to processing agent well 270d. The following description assumes that first processing agent 350 is solution for lysing cells, second processing agent 360 is dispersion liquid of magnetic beads that nonspecifically adsorb DNAs, third processing agent 370 is washing solution for washing magnetic beads, and fourth processing agent 380 is an eluate for eluting DNA bound to magnetic beads.

Figure 7B:
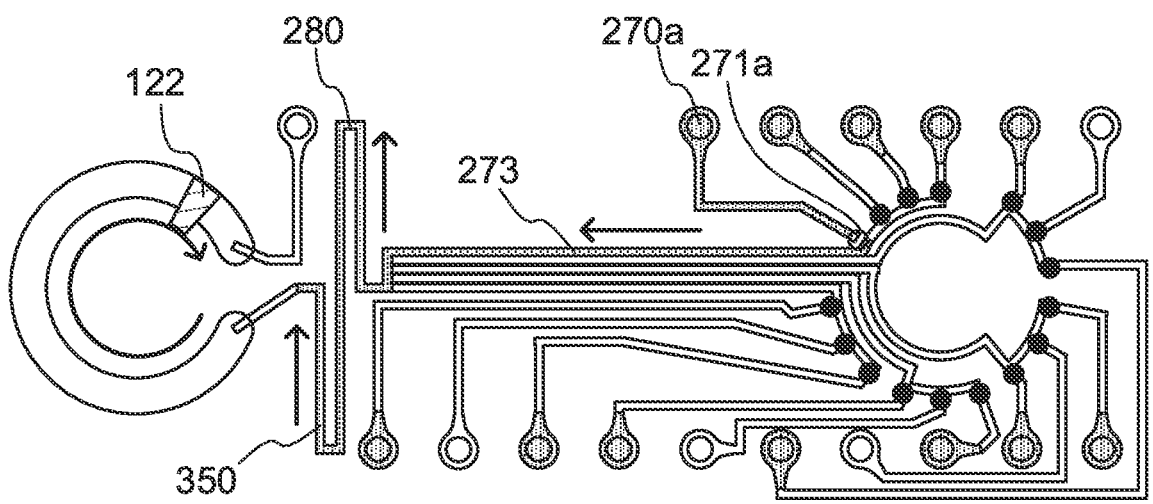

Next, first inner rotary member 111 is rotated to open only processing agent valve 271a, and second rotary member 120 is rotated to cause rotary membrane pump 290 to suction the fluid (e.g., air) in common channel 280. In this manner, as illustrated in FIG. 7B, solution (first processing agent) 350 in processing agent well 270a is introduced into common channel 280 from processing agent channel 273. At this time, solution 350 does not enter first channel 233, second channel 243, third channel 253 and fourth channel 263. When the required amount of solution 350 is introduced into common channel 280, the rotation of second rotary member 120 is stopped to stop the suction at rotary membrane pump 290.

Figure 8A:
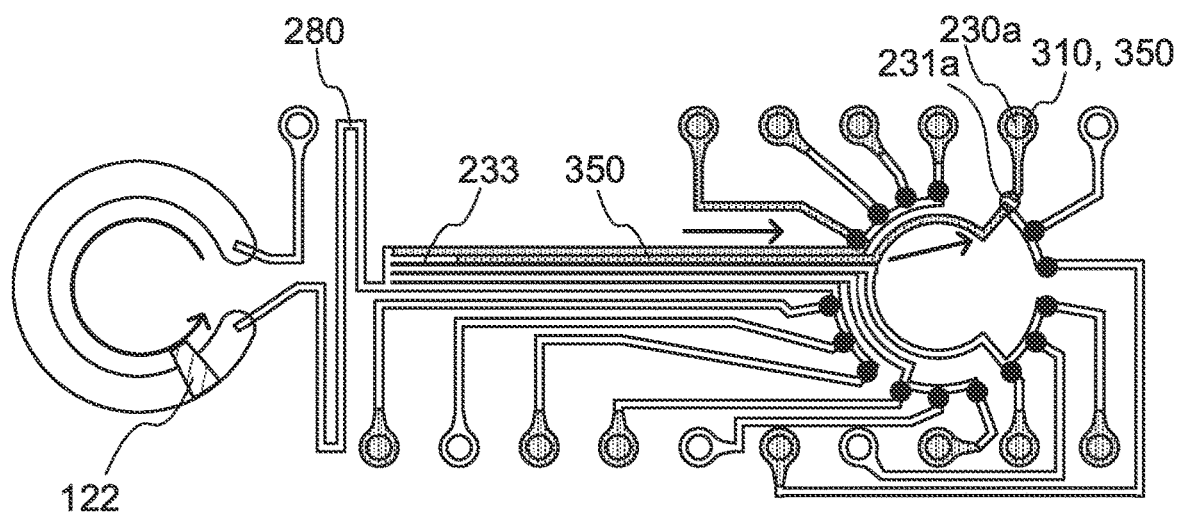
FIGS. 8A and 8B are schematic views for describing operations of the liquid handling system and the liquid handling device according to the embodiment.

Next, first inner rotary member 111 and first outer rotary member 115 are rotated to open only first valve 231a, and second rotary member 120 is rotated to cause rotary membrane pump 290 to push out the liquid in common channel 280. In this manner, as illustrated in FIG. 8A, solution 350 in common channel 280 is introduced into first well 230a where first sample 310 is housed, through first channel 233. At this time, solution 350 does not enter second channel 243, third channel 253 and fourth channel 263.

Figure 8B:
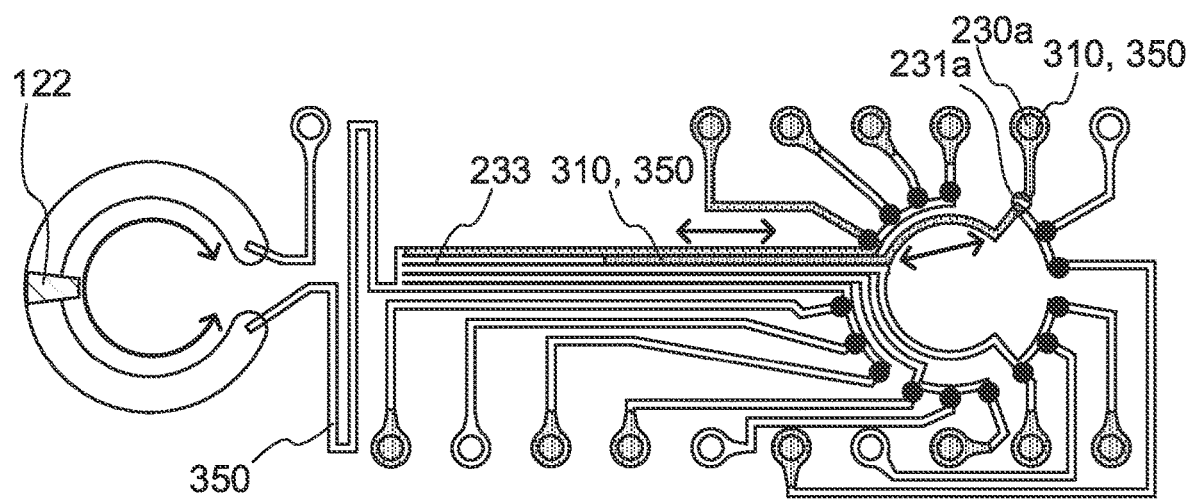

Next, second rotary member 120 is rotated while intermittently switching the rotational direction to cause rotary membrane pump 290 to suction and push out the fluid in common channel 280. In this manner, as illustrated in FIG. 8B, first sample 310 and solution 350 in first well 230a are moved back and forth between first channel 233 and first well 230a and mixed. At this time, the mixture of first sample 310 and solution 350 does not enter second channel 243, third channel 253, fourth channel 263 and processing agent channel 273. First sample 310 and solution 350 are housed in first well 230a after being sufficiently mixed. In the mixture, the cell contained in first sample 310 is lysed and the DNA is released.

Figure 9A:
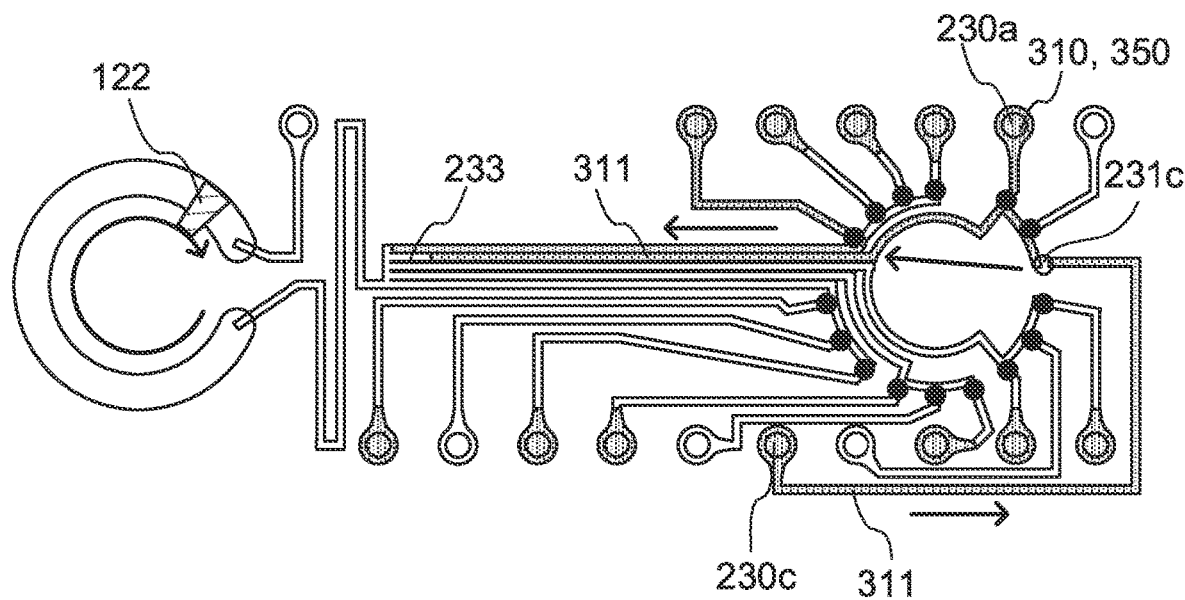
FIGS. 9A and 9B are schematic views for describing operations of the liquid handling system and the liquid handling device according to the embodiment.

Next, first inner rotary member 111 and first outer rotary member 115 are rotated to open only first valve 231c, and second rotary member 120 is rotated to cause rotary membrane pump 290 to suction the fluid in common channel 280. In this manner, as illustrated in FIG. 9A, washing solution 311 in first well 230c is introduced into first channel 233, and first channel 233 is washed. At this time, washing solution 311 does not enter second channel 243, third channel 253, fourth channel 263 and processing agent channel 273.

Figure 9B:
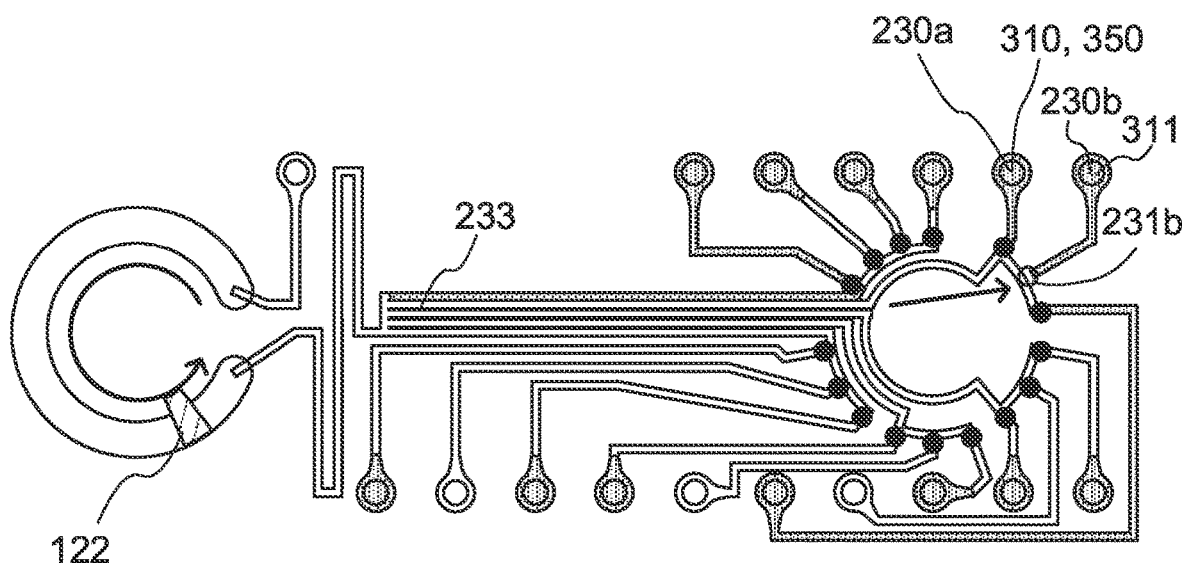

Next, first inner rotary member 111 and first outer rotary member 115 are rotated to open only first valve 231b, and second rotary member 120 is rotated to cause rotary membrane pump 290 to push out the fluid in common channel 280. In this manner, as illustrated in FIG. 9B, washing solution 311 in first channel 233 is housed in first well (effluent well) 230b. At this time, washing solution 311 does not enter second channel 243, third channel 253, fourth channel 263 and processing agent channel 273.

Figure 10A:
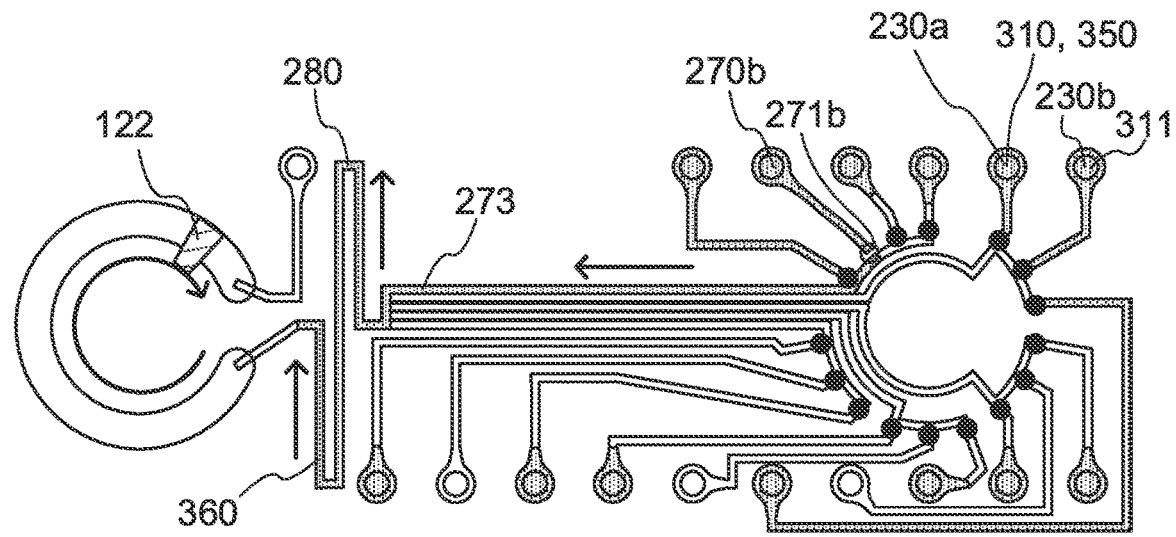
FIGS. 10A and 10B are schematic views for describing operations of the liquid handling system and the liquid handling device according to the embodiment.

Next, first inner rotary member 111 is rotated to open only processing agent valve 271b, and second rotary member 120 is rotated to cause rotary membrane pump 290 to suction the fluid in common channel 280. In this manner, as illustrated in FIG. 10A, magnetic beads dispersion liquid (second processing agent) 360 in processing agent well 270b is introduced into common channel 280 from processing agent channel 273. At this time, magnetic beads dispersion liquid 360 does not enter first channel 233, second channel 243, third channel 253 and fourth channel 263. When the required amount of magnetic beads dispersion liquid 360 is introduced into common channel 280, the rotation of second rotary member 120 is stopped to stop the suction at rotary membrane pump 290.

Figure 10B:
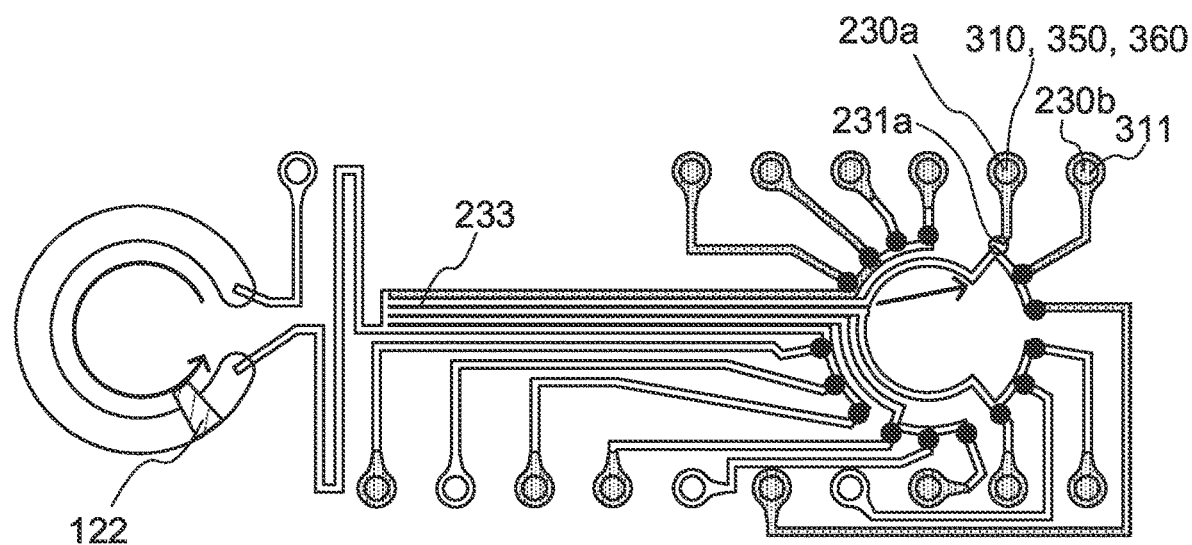

Next, first inner rotary member 111 and first outer rotary member 115 are rotated to open only first valve 231a, and second rotary member 120 is rotated to cause rotary membrane pump 290 to push out the liquid in common channel 280. In this manner, as illustrated in FIG. 10B, magnetic beads dispersion liquid 360 in common channel 280 is introduced into first well 230a where the mixture of first sample 310 and solution 350 is housed, through first channel 233. At this time, magnetic beads dispersion liquid 360 does not enter second channel 243, third channel 253 and fourth channel 263. Thereafter, second rotary member 120 is rotated while intermittently switching the rotational direction to sufficiently mix first sample 310, solution 350 and magnetic beads dispersion liquid 360 in first well 230a (omitted in the drawing; see FIG. 8B). At this time, the mixture of first sample 310, solution 350 and magnetic beads dispersion liquid 360 does not enter second channel 243, third channel 253, fourth channel 263 and processing agent channel 273. Thereafter, it is put in a static state for a predetermined period of time to cause magnetic beads 360' with adsorbed DNA to sink, and separate the mixture into magnetic beads 360' with adsorbed DNA and the supernatant.

Figure 11A:
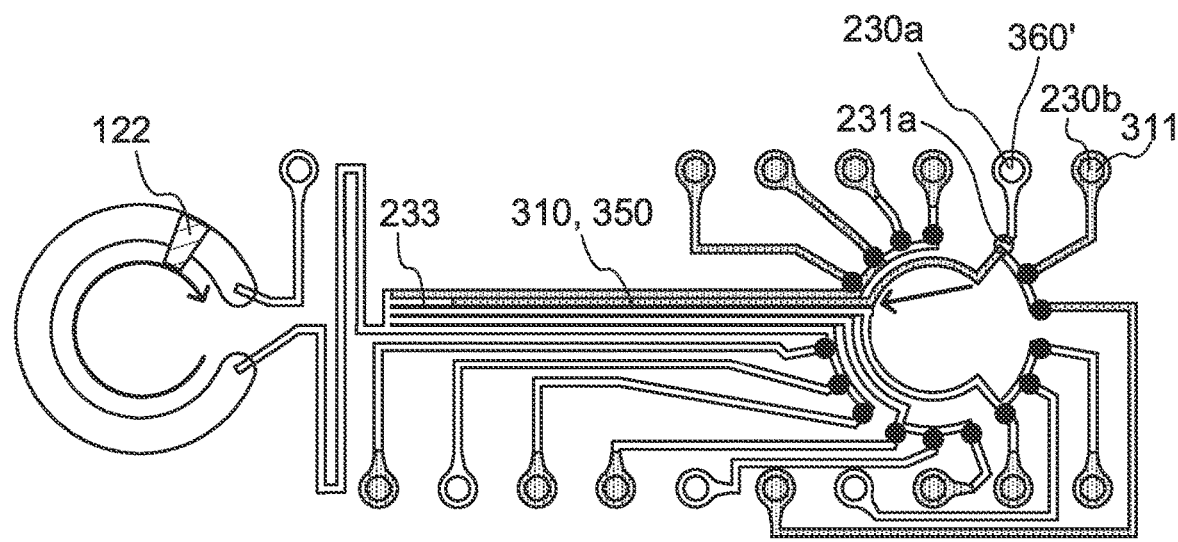
FIGS. 11A and 11B are schematic views for describing operations of the liquid handling system and the liquid handling device according to the embodiment.

Next, second rotary member 120 is rotated to cause rotary membrane pump 290 to suction the fluid in common channel 280. In this manner, as illustrated in FIG. 11A, the supernatant in first well 230a is introduced into first channel 233, and magnetic beads 360' with adsorbed DNA remain in first well 230a. At this time, the supernatant does not enter second channel 243, third channel 253, fourth channel 263 and processing agent channel 273.

Figure 11B:
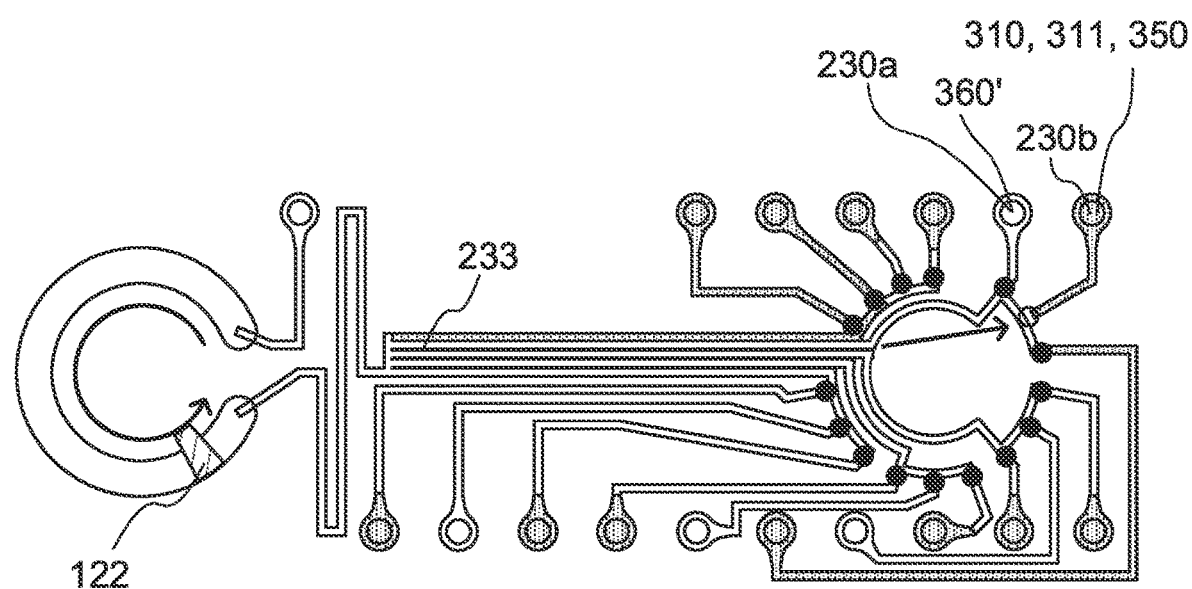

Next, first inner rotary member 111 and first outer rotary member 115 are rotated to open only first valve 231b, and second rotary member 120 is rotated to cause rotary membrane pump 290 to push out the fluid in common channel 280. In this manner, as illustrated in FIG. 11B, the supernatant in first channel 233 is housed in first well (effluent well) 230b. At this time, the supernatant does not enter second channel 243, third channel 253, fourth channel 263 and processing agent channel 273. Note that when the supernatant remains in first well 230a even after single movement of the supernatant from first well 230a to first well 230b, the movement of supernatant from first well 230a to first well 230b is repeated until the supernatant in first well 230a is eliminated.

Next, first inner rotary member 111 and first outer rotary member 115 are rotated to open only first valve 231c, and second rotary member 120 is rotated to cause rotary membrane pump 290 to suction the fluid in common channel 280. In this manner, washing solution 311 in first well 230c is introduced into first channel 233, and first channel 233 is washed (omitted in the drawing; see FIG. 9A). At this time, washing solution 311 does not enter second channel 243, third channel 253, fourth channel 263 and processing agent channel 273.

Next, first inner rotary member 111 and first outer rotary member 115 are rotated to open only first valve 231b, and second rotary member 120 is rotated to cause rotary membrane pump 290 to push out the fluid in common channel 280. In this manner, washing solution 311 in first channel 233 is housed in first well (effluent well) 230b (omitted in the drawing; see FIG. 9B). At this time, washing solution 311 does not enter second channel 243, third channel 253, fourth channel 263 and processing agent channel 273.

Thereafter, through the same procedure, washing solution (third processing agent) 370 of processing agent well 270c is introduced to first well 230a through processing agent channel 273, common channel 280 and first channel 233 to wash magnetic beads 360' in first well 230a. In addition, washing solution 370 in first well 230a is moved into first well (effluent well) 230b through first channel 233. At this time, washing solution 370 does not enter second channel 243, third channel 253, fourth channel 263 and processing agent channel 273. Thereafter, washing solution 311 in first well 230c is introduced into first channel 233, and first channel 233 is washed.

Figure 12:
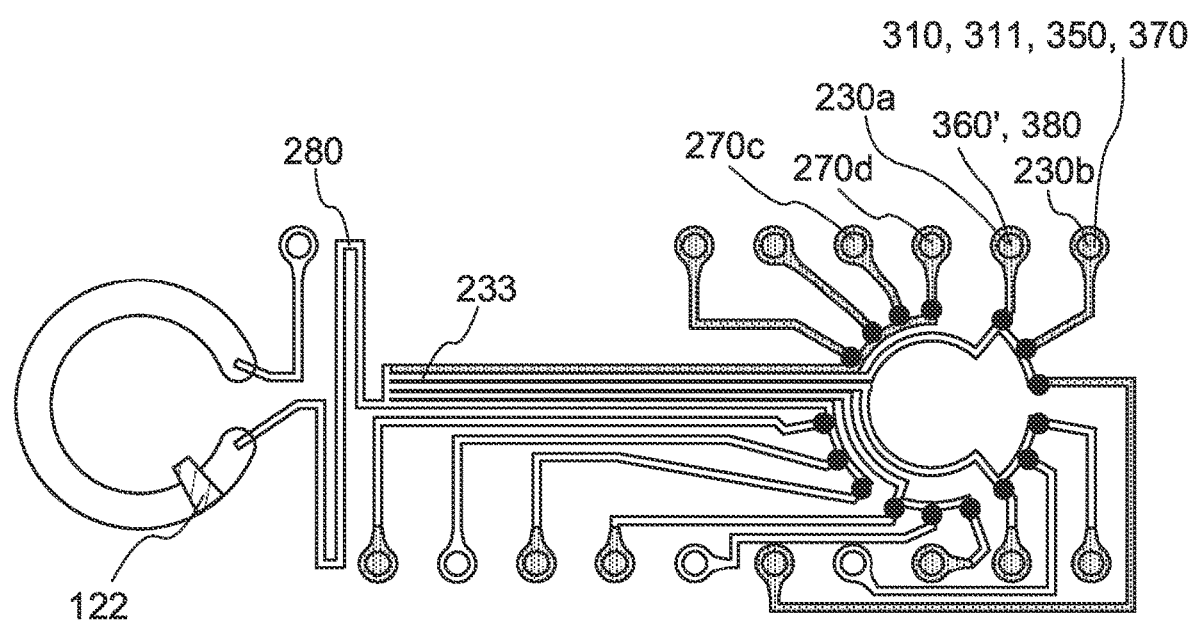
FIG. 12 is a schematic view for describing operations of the liquid handling system and the liquid handling device according to the embodiment.

Further, through the same procedure, as illustrated in FIG. 12, eluate (fourth processing agent) 380 of processing agent well 270d is introduced to first well 230a through processing agent channel 273, common channel 280 and first channel 233 to release DNA from magnetic beads 360' in first well 230a. At this time, eluate 380 does not enter second channel 243, third channel 253 and fourth channel 263.

Through the above-mentioned procedure, by processing first sample 310, a DNA extract of first sample 310 can be prepared in first well 230a. In the above-mentioned procedure, liquid that has made contact with first sample 310 never enters second channel 243, third channel 253, fourth channel 263 and processing agent channel 273.

Thereafter, through the same procedure as first sample 310, a DNA extract of second sample 320 is prepared in second well 240a, a DNA extract of third sample 330 is prepared in third well 250a, and a DNA extract of fourth sample 340 is prepared in fourth well 260a. In preparation of the DNA extract of second sample 320, the liquid that has made contact with second sample 320 never enters first channel 233, third channel 253, fourth channel 263 and processing agent channel 273. In preparation of the DNA extract of third sample 330, the liquid that has made contact with third sample 330 never enters first channel 233, second channel 243, fourth channel 263 and processing agent channel 273. In preparation of the DNA extract of fourth sample 340, the liquid that has made contact with fourth sample 340 never enters first channel 233, second channel 243, third channel 253 and processing agent channel 273. Thus, the contamination of the samples does not occur.

Effect

As described above, with liquid handling system 100 and liquid handling device 200 according to the present embodiment, the first sample, the second sample, the third sample and the fourth sample can be processed while preventing contamination without the need for large apparatuses.

Modification

Note that while an example of liquid handling device 200 including a rotary membrane valve and a rotary membrane pump is described in the present embodiment, the present invention is not limited to this. For example, each valve may be a valve having a configuration other than that of rotary membrane valves. In addition, each channel may be connected to a pump other than rotary membrane valves.

In addition, while an example of liquid handling device 200 that processes samples of four types is described in the present embodiment, the present invention is not limited to this. For example, the liquid handling device may be configured to process samples of two, three, five or more types.

In addition, liquid handling device 200 may further include components other than substrate 210 and film 220. For example, liquid handling device 200 may further include a sensor (e.g., a CMOS sensor) configured to detect states in channels or wells.

In addition, while an example of liquid handling device 200 including film 220 of a single layer structure is described in the present embodiment, the present invention is not limited to this. For example, the liquid handling device may include film 220 of a multiple-layer structure.

Figure 13B:
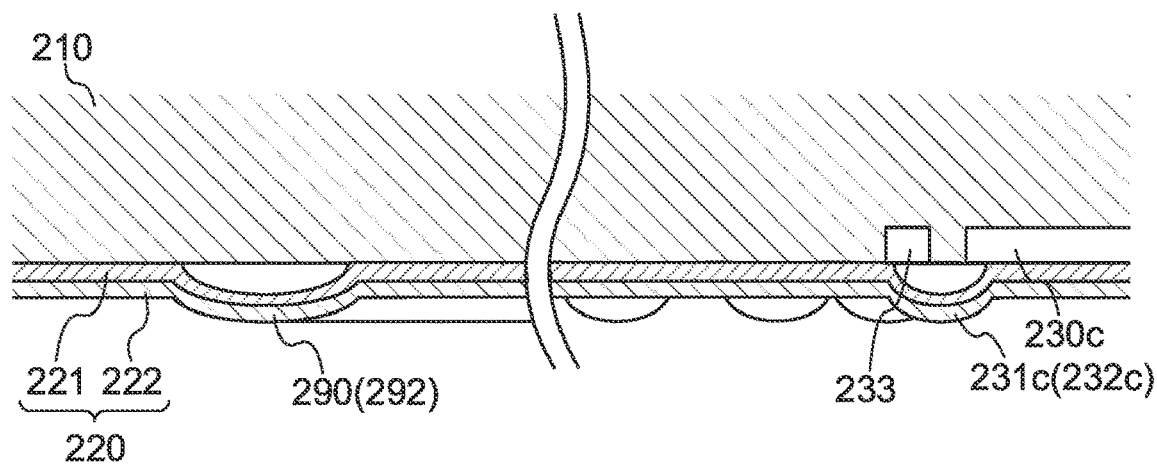
FIGS. 13B and 13C are partially enlarged views of a liquid handling device according to a modification of the embodiment.
Figure 13C:
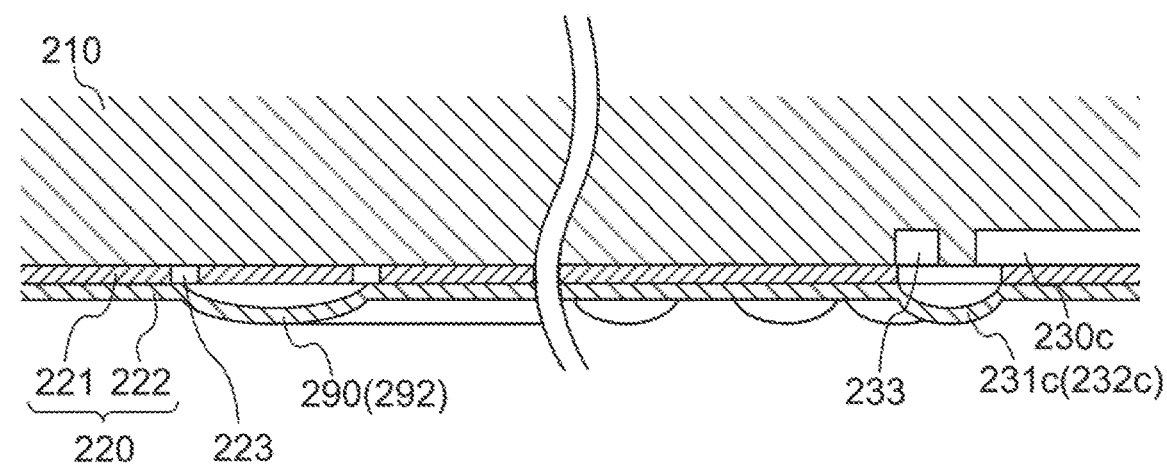

FIG. 13A is a partially enlarged view of liquid handling device 200 including film 220 of a single layer structure. FIGS. 13B and 13C are partially enlarged views of liquid handling device 200 including film 220 of a two-layer structure. FIGS. 13A to 13C illustrate cross-sections of the vicinity of first valve 231c and the vicinity of rotary membrane pump 290.

As illustrated in FIG. 13B, film 220 may include first film 221 joined to substrate 210, and second film 222 joined to first film 221. In this case, it is preferable that glass transition point Tgf1 of the material of first film 221 be smaller than glass transition point Tgs of the material of substrate 210 (Tgf1<Tgs), and be smaller than glass transition point Tgf2 of the material of second film 222 (Tgf1<Tgf2). In addition, it is preferable that Young's modulus Ef1 of the material of first film 221 be smaller than Young's modulus Es of the material of substrate 210 (Ef1<Es), and be smaller than Young's modulus Ef2 of the material of second film 222 (Ef1<Ef2). By setting glass transition point Tgf1 and Young's modulus Ef1 of the material of first film 221 to some smaller value, the bonding of film 220 to substrate 210 can be improved, and the pressing force rotary members 110 and 120 required for deforming diaphragms 232 and 292 can be reduced. On the other hand, by setting glass transition point Tgf2 and Young's modulus Ef2 of the material of second film 222 to some larger value, the ease of shaping and the shape resilience of film 220 can be improved. Each of first film 221 and second film 222 may be an elastic film. The material of first film 221 and second film 222 may be appropriately selected from publicly known resins. Examples of the material of first film 221 include polyethylene, polystyrene, elastomer resin, and silicone resin. Examples of the material of second film 222 include polycarbonate, polymethylmethacrylate, polyether, and cyclo-olefin resin.

As illustrated in FIG. 13B, in first film 221 and second film 222, a portion that functions as a diaphragm may be protruded outward (opposite to substrate 210). In addition, as illustrated in FIG. 13C, second film 222 alone may be protruded outward. A film for improving the slidability may be formed in the external surface of second film 222. In addition, as necessary, a through hole may be provided in first film 221 and second film 222.

In addition, as illustrated in FIG. 13C, in rotary membrane pump 290, it is possible to provide slit (through hole) 223 in first film 221 at portions corresponding to the outer edge of diaphragm 292 of second film 222. In this manner, when second rotary member 120 presses diaphragm 292, diaphragm 292 can be more reliably brought into intimate contact with substrate 210 (first film 221).

INDUSTRIAL APPLICABILITY

For example, the liquid handling device of the embodiment of the present invention is useful for various uses such as laboratory tests, food tests and environment tests.

REFERENCE SIGNS LIST

100 Liquid handling system
110 First rotary member
111 First inner rotary member
112 First inner body
113 First inner protrusion
114 First inner recess
115 First outer rotary member
116 First outer body
117 First outer protrusion
118 First outer recess
120 Second rotary member
121 Second body
122 Second protrusion
200 Liquid handling device
210 Substrate
220 Film
221 First film
222 Second film
223 Slit
230 First well
231 First valve
232 Diaphragm
233 First channel
240 Second well
241 Second valve
242 Diaphragm
243 Second channel
250 Third well
251 Third valve
252 Diaphragm
253 Third channel
260 Fourth well
261 Fourth valve
262 Diaphragm
263 Fourth channel
270 Processing agent well
271 Processing agent valve
272 Diaphragm
273 Processing agent channel
280 Common channel
290 Rotary membrane pump
291 Ventilation hole
292 Diaphragm
310 First sample
311 Washing solution
320 Second sample
321 Washing solution
330 Third sample
331 Washing solution
340 Fourth sample
341 Washing solution
350 First processing agent (solution)
360 Second processing agent (magnetic beads dispersion liquid)
360' Magnetic beads
370 Third processing agent (washing solution)
380 Fourth processing agent (eluate)
CA1, CA2 Central axis

The invention claimed is:

1. A liquid handling device configured to process a first sample and a second sample, the liquid handling device comprising:
a plurality of first wells configured for the first sample;
a first channel connected to the plurality of first wells;
a plurality of first valves disposed between the plurality of first wells and the first channel;
a plurality of second wells configured for the second sample;
a second channel connected to the plurality of second wells;
a plurality of second valves disposed between the plurality of second wells and the second channel;
a plurality of processing agent wells configured for a processing agent configured to process the first sample and the second sample;
a processing agent channel connected to the plurality of processing agent wells;
a plurality of processing agent valves disposed between the plurality of processing agent wells and the processing agent channel; and
a common channel connected to the first channel, the second channel and the processing agent channel, wherein
the plurality of first valves, the plurality of second valves, and the plurality of processing agent valves are rotary membrane valves,
the plurality of first valves and the plurality of second valves are disposed on a circumference of a first circle, and
the plurality of processing agent valves is disposed on a circumference of a second circle concentric with the first circle.

2. The liquid handling device according to claim 1, wherein one end portion of the common channel is connected to one end portion of the first channel, one end portion of the second channel, and one end portion of the processing agent channel.

3. The liquid handling device according to claim 1, further comprising a rotary membrane pump connected to the common channel.

4. The liquid handling device according to claim 1, wherein the liquid handling device includes:
- a substrate including a plurality of grooves and a plurality of through holes; and
- a film joined to the substrate to close openings of the plurality of grooves and openings of the plurality of through holes, wherein the first channel, the second channel, the processing agent channel and the common channel are composed of the plurality of grooves and the film that closes the openings of the plurality of grooves, wherein the plurality of first wells, the plurality of second wells and the plurality of processing agent wells are composed of the plurality of through holes and the film that closes the openings of the plurality of through holes, and wherein the film is a film of a multi-layer structure.

5. A liquid handling method of processing a first sample and a second sample using a liquid handling device, wherein the liquid handling device comprises:
- a plurality of first wells configured for the first sample;
- a first channel connected to the plurality of first wells;
- a plurality of second wells configured for the second sample;
- a second channel connected to the plurality of second wells;
- a plurality of processing agent wells configured for a processing agent configured to process the first sample and the second sample;
- a processing agent channel connected to the plurality of processing agent wells; and
- a common channel connected to the first channel, the second channel and the processing agent channel, wherein the method comprises:
- providing the first sample to one of the plurality of first wells;
- providing the second sample to one of the plurality of second wells;
- moving, from one of the plurality of processing agent wells, the processing agent to the first well to which the first sample has been provided through the processing agent channel, the common channel and the first channel;
- moving liquid containing the first sample to the first channel from the first well provided with the first sample and then moving the liquid containing the first sample in the first channel to one of the plurality of first wells;
- moving, from one of the plurality of processing agent wells, the processing agent to the second well to which the second sample has been provided through the processing agent channel, the common channel and the second channel; and
- moving liquid containing the second sample to the second channel from the second well provided with the second sample and then moving the liquid containing the second sample in the second channel to one of the plurality of second wells.

* * * * *